United States Patent [19]
Webb et al.

[11] Patent Number: 5,471,568
[45] Date of Patent: Nov. 28, 1995

[54] OBJECT-ORIENTED APPARATUS AND METHOD FOR SCAN LINE CONVERSION OF GRAPHIC EDGES

[75] Inventors: Richard D. Webb; Arthur W. Cabral, both of Sunnyvale, Calif.

[73] Assignee: Taligent, Inc., Cupertino, Calif.

[21] Appl. No.: 85,340

[22] Filed: Jun. 30, 1993

[51] Int. Cl.$^6$ .................................................. G06T 15/00
[52] U.S. Cl. .......................... 395/133; 395/126; 395/143
[58] Field of Search ...................................... 395/120, 121, 395/126, 127, 132, 133–139, 142, 143, 140; 382/8, 25

[56] References Cited

U.S. PATENT DOCUMENTS

| | | | |
|---|---|---|---|
| 4,493,080 | 8/1985 | Dysart et al. | 364/200 |
| 4,704,694 | 11/1987 | Czerniejewski | 382/25 X |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,063,375 | 11/1991 | Lien et al. | 394/140 |
| 5,075,848 | 12/1991 | Lai et al. | 395/425 |
| 5,093,914 | 3/1992 | Coplien et al. | 395/700 |
| 5,115,558 | 10/1992 | Tannenbaum et al. | 382/8 X |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |

OTHER PUBLICATIONS

Foley et al "Fundamentals of Interactive Computer Graphics" (1984) pp. 431–477, 964, 965.
ACM Transactions on Graphics, V.12(1), Jan. 1993, New York, US, pp. 103–107, Salesin and Barzel "Adjustable Tools: An Object–Oriented Interaction Metaphor".
Computer, V.22(12), Dec. 1989, Long Beach, US, pp. 43–54, Goodman "Knowledge–Based Computer Vision".
Computer Systems, V.10(1), Jan. 1990, Bromley, GB, pp. 31–32, Drake "Objects and Images".
Computers and Graphics, V.13(3), 1989, Oxford GB, pp. 321–327, Fiume, "Active Objects in the Construction of Graphical User Interfaces".
Proceedings Visualization '92, Oct. 19, 1992, Los Alamitos, US, pp. 219–226, Schroeder, "Visage: An Object–Oriented Scientific Visualization System".

*Primary Examiner*—Almis R. Jankus
*Attorney, Agent, or Firm*—Keith Stephens

[57] ABSTRACT

An object-oriented graphic system performs a scan conversion process on a geometric figure with edges. The figure is represented by a graphic object which contains data describing the edges and a method for traversing the edges to outline the figure. The scan conversion is performed by loading the graphic object into a memory and using the graphic object data and methods to generate a plurality of edge objects, each of which represents one of the edges. The edge objects are then manipulated by means of an edge engine object to generate a plurality of scan lines of varying numbers of pixels which scan lines together fill or frame the geometric figure and complete the scan conversion. The geometric figure can be displayed by displaying the pixels in the scan lines.

19 Claims, 14 Drawing Sheets

OBJECT-ORIENTED APPARATUS AND METHOD FOR SCAN LINE CONVERSION OF GRAPHIC EDGES

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems and more particularly to a system and method for processing edge information on a graphic display.

BACKGROUND OF THE INVENTION

Graphic processing of edge information is a critical problem for presenting information in an aesthetic, ergonomic manner. Thus, modern graphic systems, which utilize information-handling systems that are designed to process a wide variety of information, including text and graphic information, are becoming increasingly sophisticated so as to process this information in a more ergonomic manner. For example, the limited ability of a computer programmer or computer user to program or process graphic edge information in a selected way.

Prior software operating system architectures are limited in their edge processing capability. A limitation is that the operating system architecture may not be able to support a given peripheral device for which the architecture was not designed or could not be modified to support. Also, a prior architecture may only process graphic edge information in a single, pre-defined manner.

SUMMARY OF THE INVENTION

Accordingly, it is a primary objective of the present invention to process graphic objects, and their associated edges, on a computer with a memory and an attached display in a flexible manner. The objective is accomplished by loading the graphic object into a memory, converting the graphic object into a plurality of edge objects, converting the edge objects into a plurality of scan line pixels, and displaying the scan line pixels on the display.

DETAILED DESCRIPTION OF THE INVENTION

Figure 1:
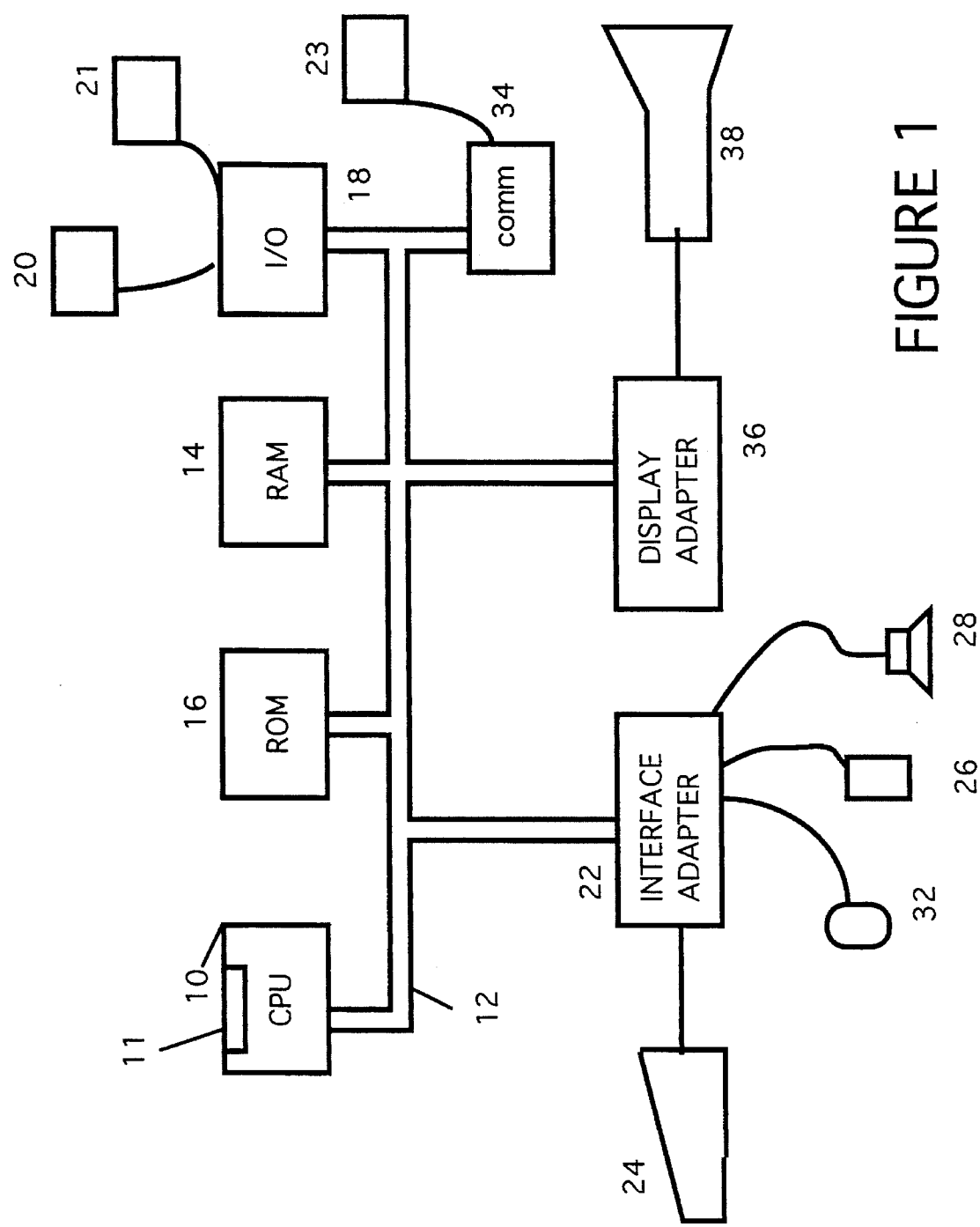
FIG. 1 is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The computer has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on the level of the system and the nature of the problem. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/ override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system flamework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented graphic framework.

A preferred embodiment employs an edge engine of a rendering pipeline to manipulate a list of TGrafEdges. It is used only by discrete devices. For example, in the TFrameBuffer device, the edge engine generates scanline spans from the edges representing filled and framed portions of a primitive. This process is known as scan conversion.

Figure 2:
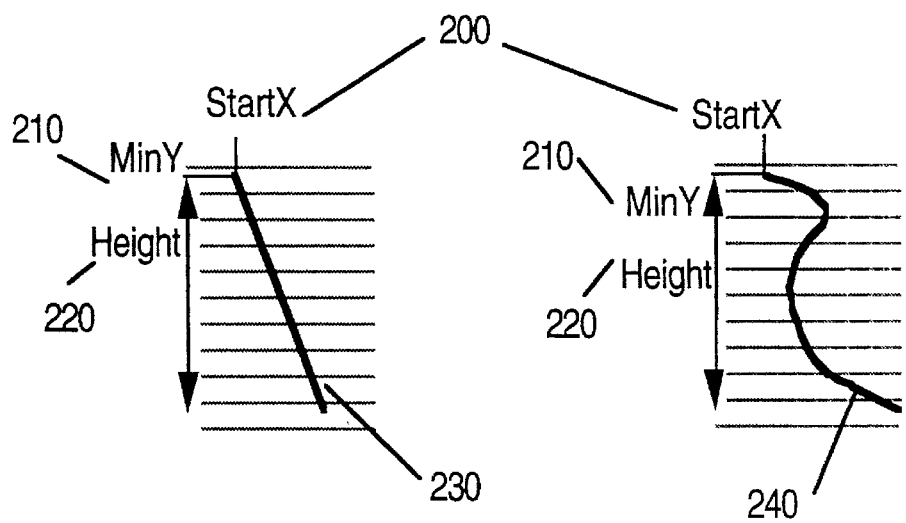
FIG. 2 is an illustration of a pair of graphic edges in accordance with a preferred embodiment.

A TGrafEdge is a polymorphic scan conversion primitive. An illustration of a pair of graphic edges is presented in FIG. 2. Each graphic edge 230, 240 has a minimum Y value 210, a starting X value 200, a height 220, and a virtual Step method. The Step method updates the X value for the next scanline (the next integer Y value). A TGrafEdge can thus describe any curve that is monotonic in Y; i.e., it has a single X value for every scan line it spans. TGrafEdge also has a reference to a single CAG node object, which is used to determine whether a point is inside or outside the entire geometry.

A simple primitive is easy to render; it has a single wrap count that determines whether a point is inside or outside the geometry. The TGArea primitive, on the other hand, can be arbitrarily complex. Each sub-primitive has its own independent wrap count. The wrap counts of all the sub-primitives can be used to calculate the state of the entire primitive. The structure for doing inside/outside calculations is set up by the TGArea and passed to the edge engine. However, the overhead associated with the more complex inside/outside calculations should be incurred only for the TGArea primitive. Subclasses of the edge engines will provide anti-aliasing scan conversion, and can be made for accelerated edges, such as rectilinear edges.

Pixel perfection is important for edge engines, since edge engines perform scan-conversion to discrete device units. Pixel perfection defines which pixels are modified, given a set of edges that define an area in device space. Even though the word "pixel" is used, pixel perfection can be useful for other discrete devices, since it defines where the discrete units lie on the device's coordinate system.

Scan conversion is the process of converting a geometry into horizontal scan line spans, which can then be drawn on a discrete graphic device. A geometry can be filled, framed, or both. The algorithm to draw a geometry that is filled and/or framed ensures that no area is drawn twice, allowing transfer modes and transparency to function correctly. An edge engine fills a geometry that is defined by list of TGrafEdges representing its outline. A user can specify the outline of a geometry by tracing its perimeter in an arbitrary direction. This determines the sign of each edge in the list. The sign of an edge is positive if it points in the direction of positive y. Edges that have no effect on the output are discarded.

Figure 3:
FIG. 3 illustrates the sort order in accordance with a preferred embodiment.

FIG. 3 illustrates the sort order in accordance with a preferred embodiment. Edges are sorted first by their smaller y values, and then by their x values within a particular y value. For each scan line that intersects the edges, one or more spans in x are generated. This is accomplished by always keeping an "active" list of edges; that is, the edges that cross the current scan line. For each scan line, the active edge list is found. Then, as an edge is crossed, one of the following rules is applied to generate the appropriate spans for the scan line: the even-odd rule or the winding number rule.

Figure 4:
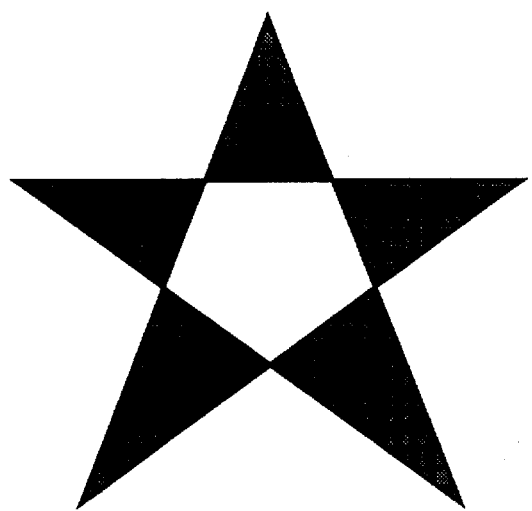
FIG. 4 is an illustration of a star-polygon, even-odd rule in accordance with a preferred embodiment.

Even-odd rule: Each time an edge is encountered, a span is either started or ended. FIG. 4 is an illustration of the generated star span for each pair of edges in accordance with a preferred embodiment.

Figure 5:
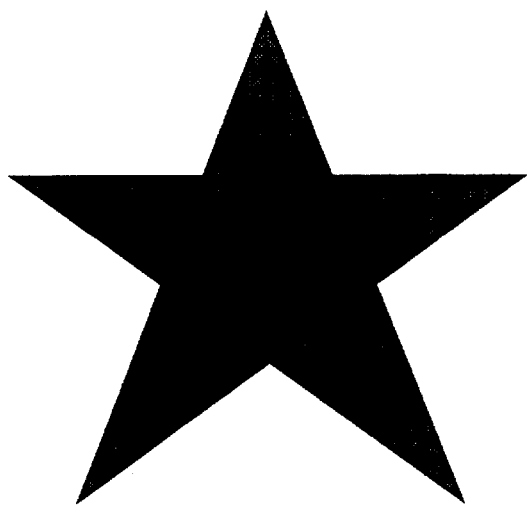
FIG. 5 is an illustration of a star polygon employing a winding number rule in accordance with a preferred embodiment.

Winding number rule: As an edge is crossed, its sign is added to a winding number initially set to zero. When the winding number becomes non-zero, a span is started. When the winding number becomes zero, the span is ended. This produces the effect of filling all the area within the outer boundary of the polygon. FIG. 5 is an illustration of a star polygon employing the winding number rule in accordance with a preferred embodiment.

The rule that is applied depends on the primitive being rendered. For example, the TGPolygon primitive, which defines a polygon graphic object, contains a parameter that specifies which rule to use. The TGEllipse primitive, on the other hand, may use either rule because both rules produce the same result when applied to a non-self-intersecting geometry. Two types of frames can be drawn around an object, depending on the intended purpose of the frame: the hairline frame and the thick frame. Both are discussed below.

The thick frame can be of any thickness. End caps, joint styles, and dashing can be applied as desired. The edge engine scan converts the thick frame and the fill at the same time. The TGrafEdges that represent both sides of the frame (left and right) are generated and inserted into the list with the fill edges. The direction, and thus the sign, of a frame edge is the same as that of the fill edge from which it was created. As the primitive is scan-converted, two winding numbers are kept: one for the left frame edges and one for the right frame edges. The spans generated for the frame depend on which fill rule is used:

Even-odd rule: As a frame edge is encountered, its sign is added to the appropriate winding number (left or right). When the two winding numbers become unequal, a span is started. When they become equal again, the span is ended.

Winding number rule: As a frame edge is encountered, its sign is added to the appropriate winding number (left or right). When the signs of the two winding numbers become unequal, a span is started. When the signs become equal again, the span is ended.

Depending on which pen balance is used, the frame may overlap the filled area. However, since the filled area and the frame are drawn together, no part of the area is drawn twice. For a centered pen, the thickness of the frame is centered around the outline of the filled area. This is accomplished by allowing the spans generated for the frame to supersede those generated for the fill.

Figure 6:
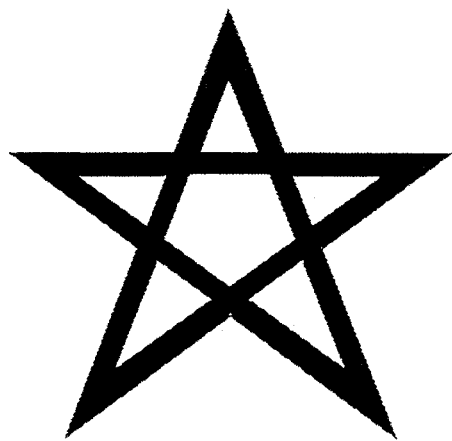
FIG. 6 illustrates a centered frame of a star polygon following a centered even-odd rule in accordance with a preferred embodiment.
Figure 7:
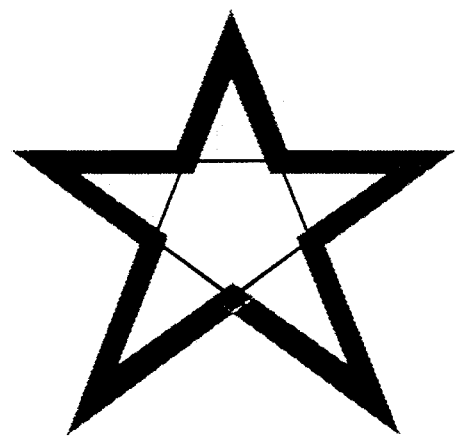
FIG. 7 illustrates a centered frame of a star polygon following a centered winding number rule in accordance with a preferred embodiment.
Figure 8:
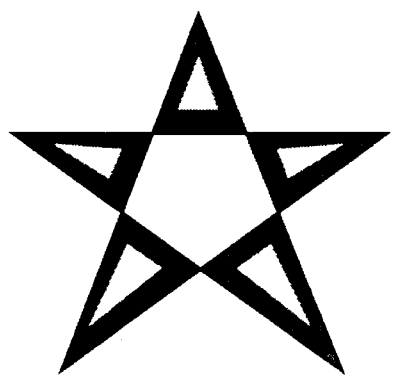
FIG. 8 illustrates an inset frame of a star polygon following the inset even-odd rule in accordance with a preferred embodiment.
Figure 9:
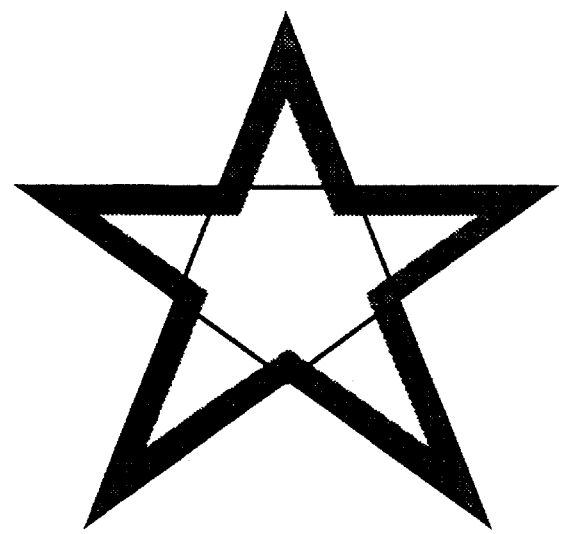
FIG. 9 illustrates an inset frame of a star polygon following the winding number rule.

FIG. 6 illustrates a centered frame of a star polygon following a centered even-odd rule in accordance with a preferred embodiment, and FIG. 7 illustrates a centered frame of a star polygon following a centered winding number rule in accordance with a preferred embodiment. For an inset pen, the thickness of the frame is completely within the outline of the filled area. The spans generated for the frame supersede those generated for the fill, but they are drawn only when there are fill spans generated. In other words, the frame is clipped to the fill geometry. This is the opposite of the outset frame. FIG. 8 illustrates an inset frame of the star polygon following the inset even-odd rule in accordance with a preferred embodiment. FIG. 9 illustrates an inset frame of the star polygon following the winding number rule.

Figure 10:
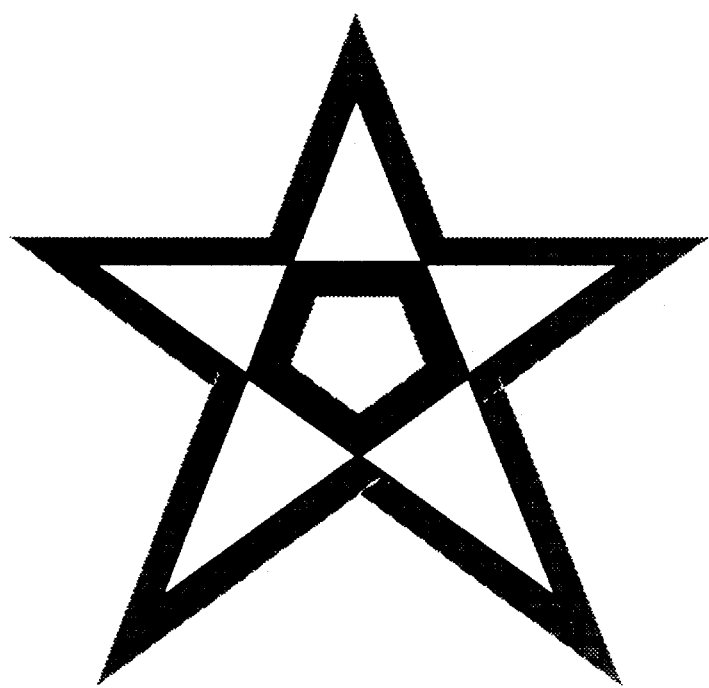
FIG. 10 illustrates an outset frame of a star polygon following the outset even-odd rule in accordance with a preferred embodiment.
Figure 11:
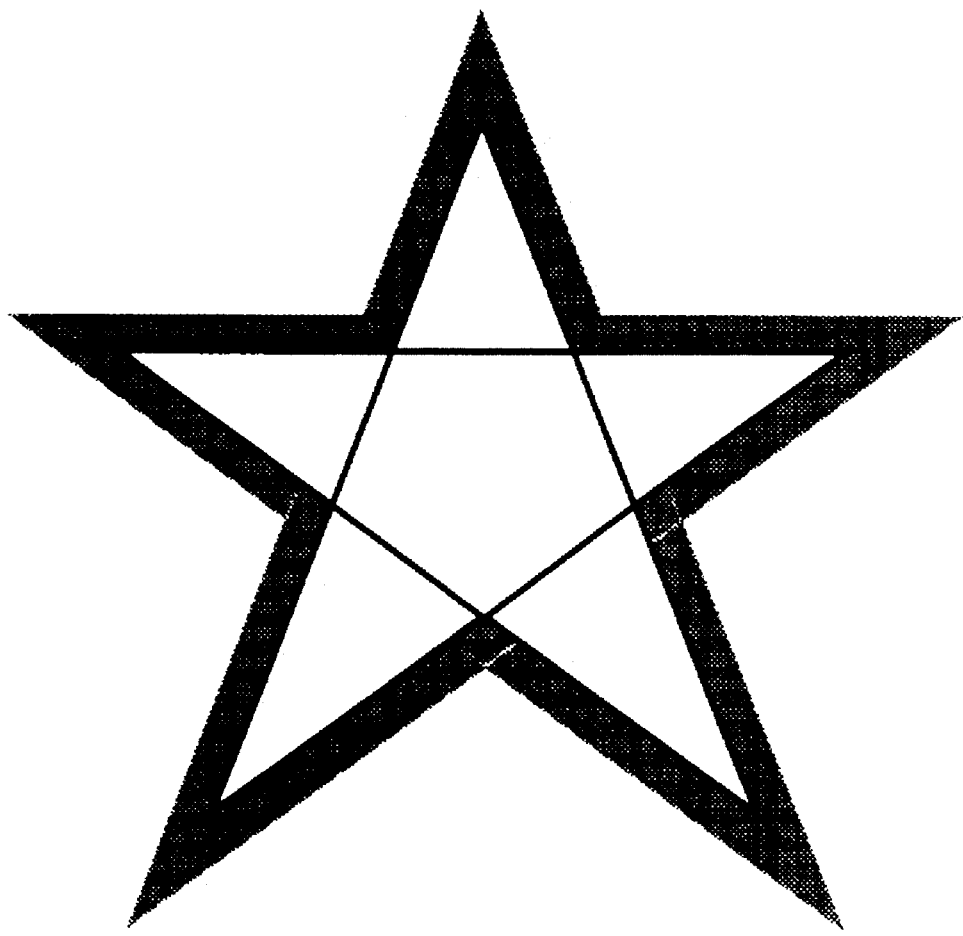
FIG. 11 illustrates an outset frame of a star polygon following the outset winding number rule in accordance with a preferred embodiment.

For an outset pen, the thickness of the frame is completely outside the outline of the filled area. The spans generated for the frame are drawn only when there are no fill spans to draw. In other words, the frame is never drawn inside the fill geometry. This is the opposite of the inset frame. FIG. 10 illustrates an outset frame of the star polygon following the outset even-odd rule in accordance with a preferred embodiment. FIG. 11 illustrates an outset frame of the star polygon following the outset winding number rule in accordance with a preferred embodiment.

Edge Engine Aliasing Subclasses

Figure 12:
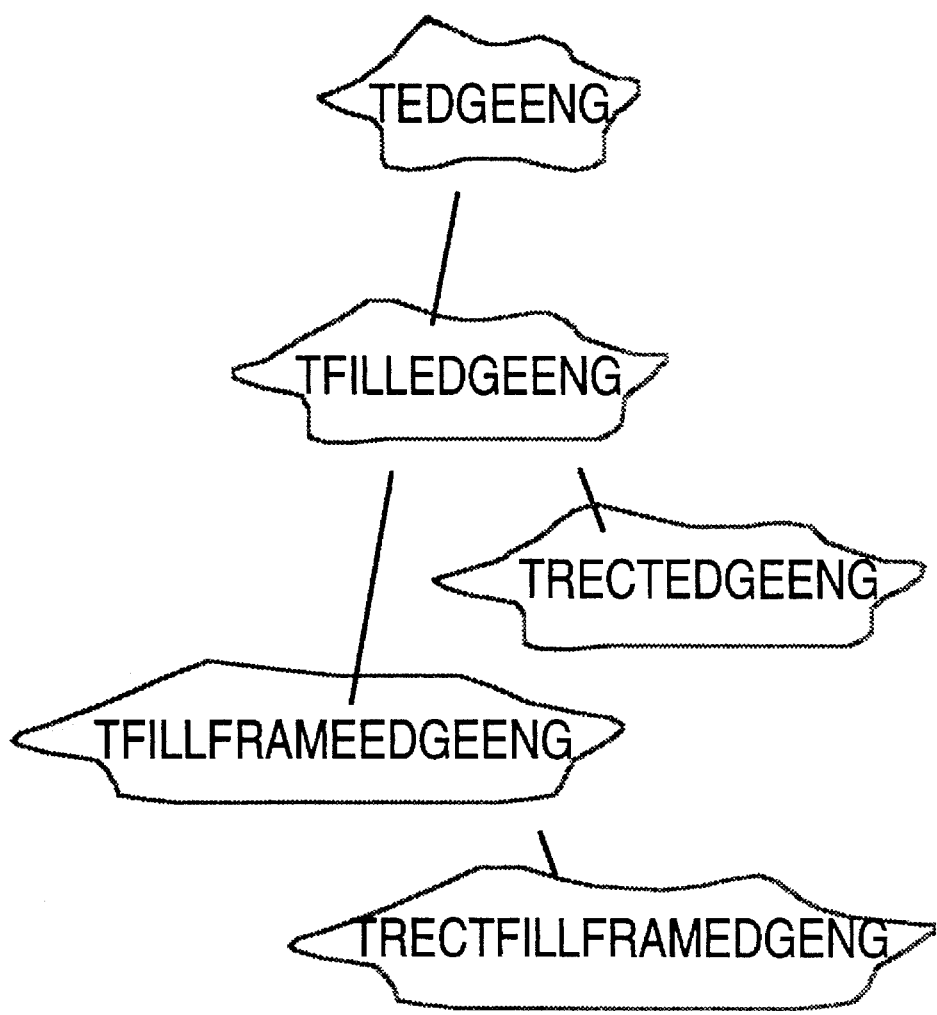
FIG. 12 illustrates the edge engines used by discrete devices in accordance with a preferred embodiment.

FIG. 12 illustrates the edge engines used by discrete devices. The anti-aliased edge engines are not shown. TEdgeEngine is an abstract class from which all the edge engines are derived. It contains a pure virtual function that accepts TGrafEdges. It also contains a pure virtual Render function.

TFillEdgeEngine performs aliased filling of the geometry described by the list of TGrafEdges. The edges can be of any type.

TRectilinearFillEdgeEngine performs aliased filling of the geometry described by the list of rectilinear TGrafEdges. It is an optimization of the TFillEdgeEngine. It assumes that each TGrafEdge is a vertical line.

TFillAndFrameEdgeEngine performs aliased filling and framing of the geometry described by the list of TGrafEdges. The edges can be of any type.

TRectilinearFillAndFrameEdgeEngine performs aliased filling and framing of the geometry described by the list of rectilinear TGrafEdges. It is an optimization of the TFillEdgeEngine. It assumes that each TGrafEdge is a vertical line.

Edge Engine Antialiasing Subclasses

Another reason to subclass an edge engine is to accommodate antialiasing. Efficient implementations share a common optimization to convolve only the areas around the edges with the filter kernel. This optimization not only dodges a great deal of filtering operations in the interior of the shape, but it also allows for the use of simple non compositing TSpanPainter methods to be used such as PaintSpans. An antialiasing edge engine might take two approaches to convolving the edges.

The super sampling approach scan converts at a higher resolution, rendering into subpixel bitmaps which represent detail at a subpixel level. Alternatively, the subpixel scan conversion can be precalculated into a table which is indexed via some number of significant bits from the fractional component of the edges entry and exit coordinates. These bitmaps are typically 4×8 pixels. If a box filter is being used, all that is required is a population tally of the bitmaps bits. If a higher quality filter, which has a support size greater than 0.5, is used, then each outputted pixel's transparency is determined from the weighted average of itself and neighboring bitmaps.

The higher quality filter imposes one additional problem. Scan lines cannot be output until all of their contributing subpixel bitmasks have been convolved with the filter kernel and summed. This means that the edge engine will be outputting spans one to two scanlines behind their scan conversion. These approaches are typically taken when the vertices are integers or there is a need to resolve hidden surfaces. The prefiltering approach employs exact area calculations at each pixel that contains an edge. This sounds expensive but in actuality it has an efficient incremental solution. For a given pair of edges on a scanline, there can exist up to three areas of interest, the left edge, the middle or fully covered pixels, and the right edge. All pixels intersected by an edge must have their area calculated. If several adjacent pixels are intersected by a common edge, the area calculation for subsequent intersecting pixels can be computed incrementally. For an edge with a given slope, the difference of areas from one pixel to the next is constant. An approach based on this assumption is more appealing.

Whichever algorithm is employed, two edge cases might be encountered. The first case of an isolated edge is the most common. All engines will encounter this case. All of the edges from a Framing only, or Filling only edge engine fall into this category. A Filling and Framing edge engine will encounter this case on the exterior edge of the frame. After a determination has been made of the edges opacity, pixels that are non opaque must be composited with the destination pixels through the TSpanPainter's CompositeSpan method. Interior opaque spans can be set through the TSpanPainter's PaintSpans, or PaintBlock methods.

The second case of two abutting edges filled with different paints is only encountered when filling and framing. The interior seam between the frame and fill must be composited with care. No background color can contribute to the final value of pixels along this seam. The engine must call one edge's TSpanPainter GetDesiredColorAt method, to determine the color that the painter desires at that pixel. Once in possession of this color, the edge engine must call the other TSpanPainter's SetAbuttingEdgeColor, and PaintAbuttingEdgePixel methods to get the correctly blended result. The per pixel expense of the GetDesiredColorAt, and SetAbuttingEdgeColor method combination can be avoided if the TSpanPainter's IsShadingConstant method returns TRUE.

CAG Objects

Figure 13:
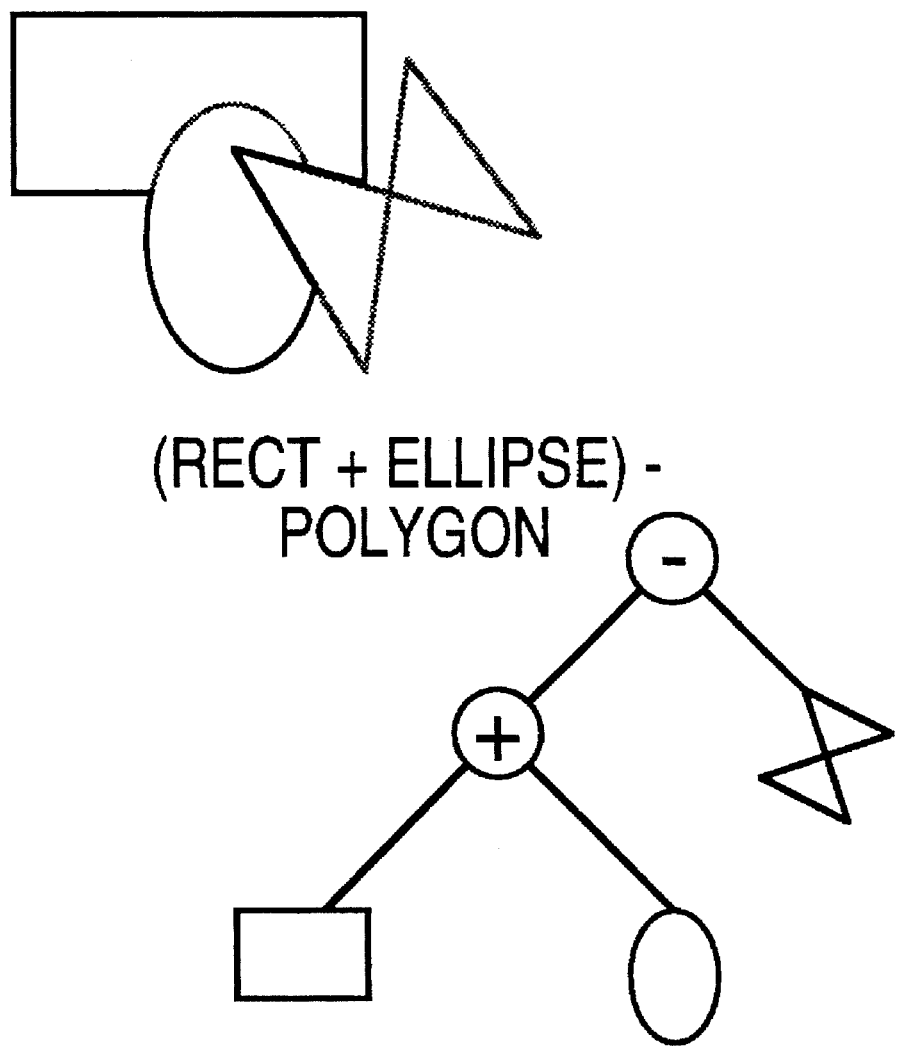
FIG. 13 is an area primitive with the illustrated structure in accordance with a preferred embodiment.
Figure 14:
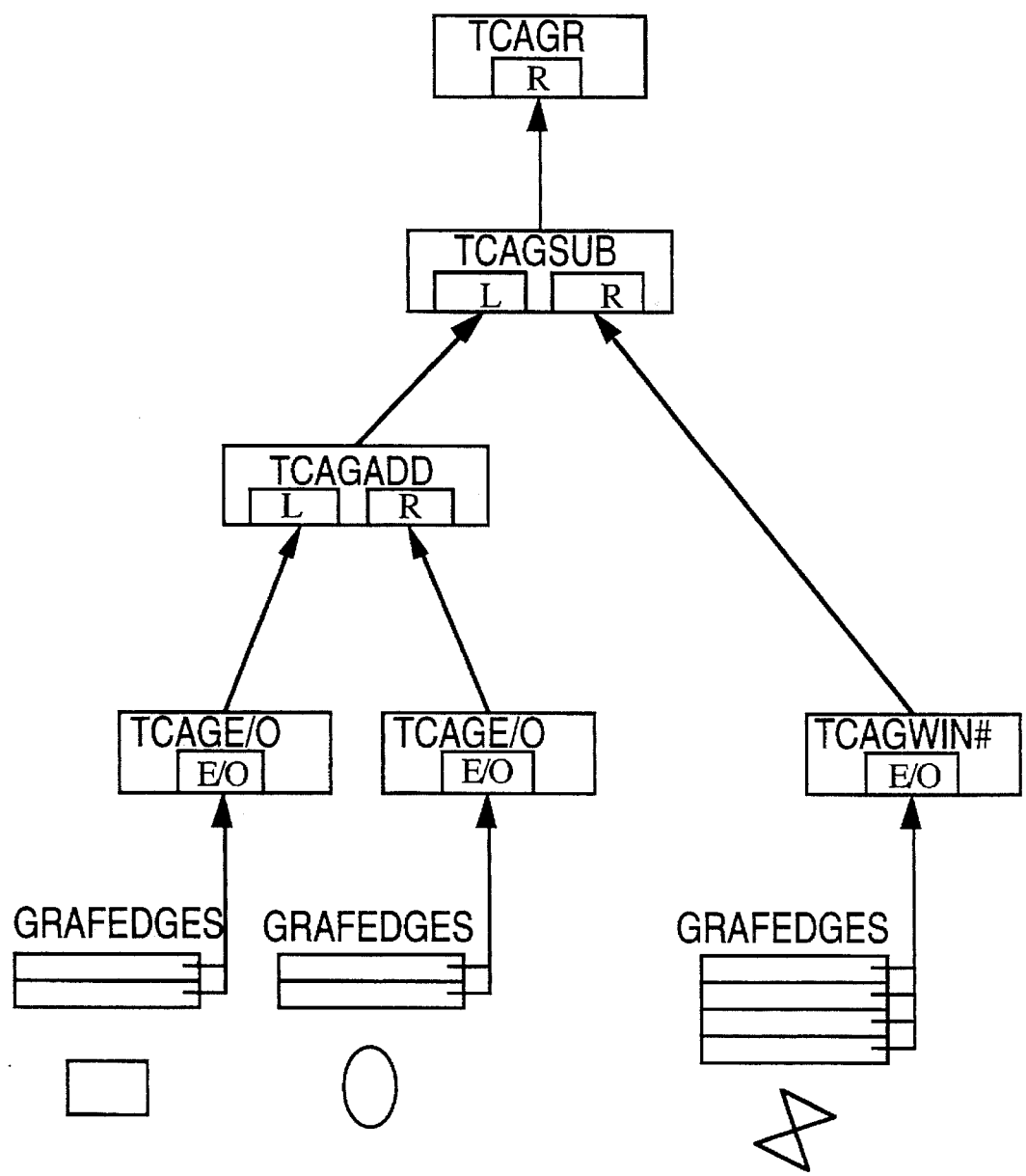
FIG. 14 illustrates a method for determining the state of the current position in accordance with a preferred embodiment.

An example of CAG objects and their use in the process of scan conversion is presented below. FIG. 13 is an area primitive with the illustrated structure in accordance with a preferred embodiment. The area consists of three different geometries, a rectangle, an ellipse and a polygon, each related by an operation. As scan-conversion is performed, the edge engine must have a method for determining the state of the current position within the geometry (inside or outside). FIG. 14 illustrates a method for determining the state of the current position in accordance with a preferred embodiment.

There are eight edges that describe the area: two for the rectangle, two for the ellipse, and four for the polygon. They each point to their "parent," which is a TCAGNode object that is notified when the state of the edge changes. When the edge engine encounters an edge, the edge notifies its parent node of the transition by passing the edge's sign to it. This sign is used by the node to determine the state (inside or outside) of the object to which the edge belongs. If the state changes, the node notifies its parent node. The cycle continues until no more changes occur, or until it reaches the root node. This processing is a quick and effective method for maintaining the current state of the area as it is scan-converted. The edge engine queries the root node for the current state of the area and produces scan line spans accordingly.

To generate edges from geometries, the following steps are employed. First, the monotonic-in-y edges must be identified. Horizontal edges can be discarded because they are of no consequence when scan converting in the y direction. For each edge, initialize an edge object of the appropriate type with the following values:

| | |
|---|---|
| x | the x value at the top of the edge; |
| y | the y value at the top of the edge; |
| final y | the y value at the bottom of the edge; and |
| sign | +1 if the edge goes down, −1 if the edge goes up. |

Figure 15:
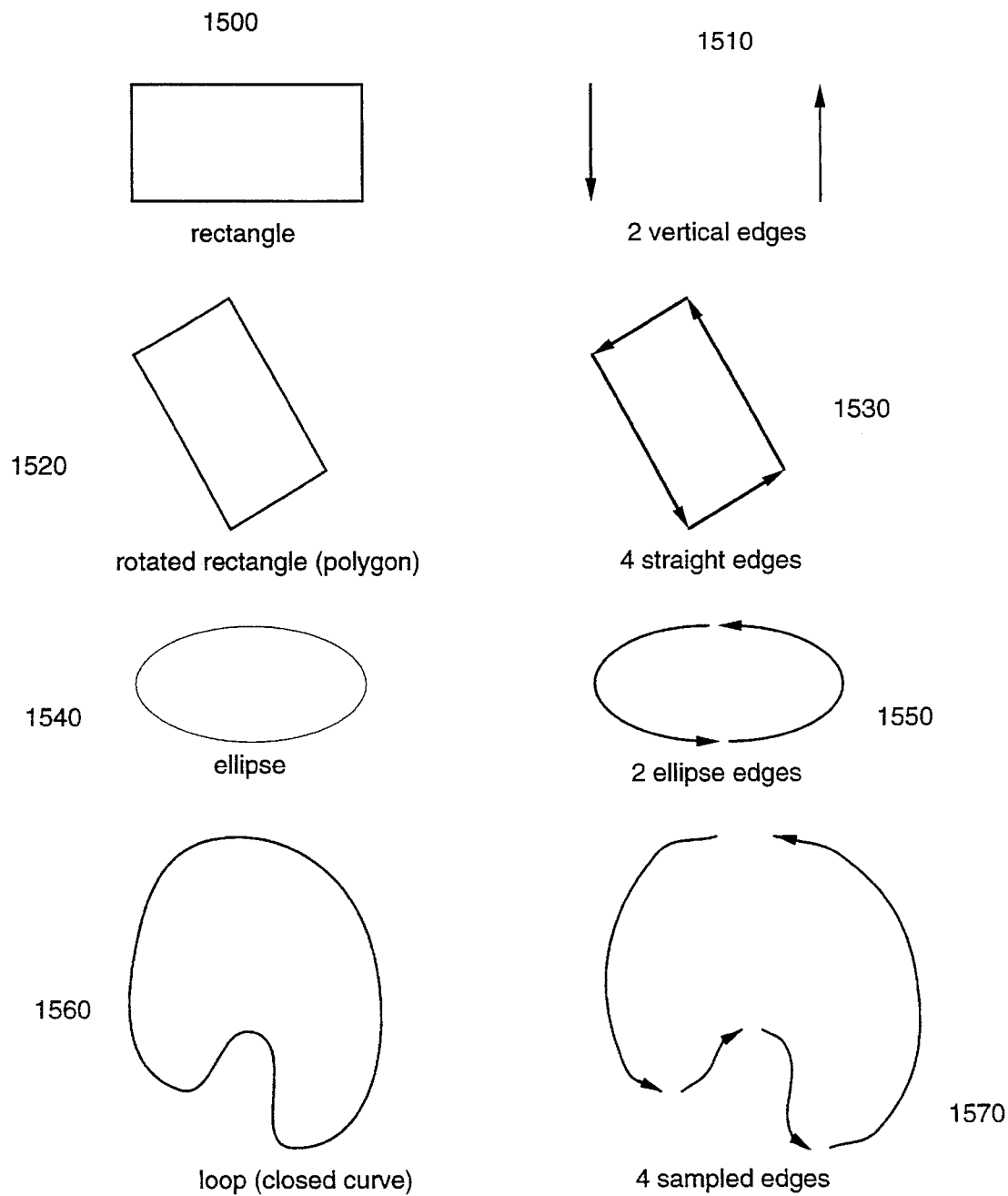
FIG. 15 illustrates various edges in accordance with a preferred embodiment.

FIG. 15 illustrates various edges in accordance with a preferred embodiment. A rectangle is presented at 1500. Two vertical edges are shown at 1510. A rotated rectangle (polygon) is presented at 1520, four straight edges are set forth at 1530, an ellipse is shown at 1540, two ellipses appear at 1550, a closed curve loop at 1560, and four sampled edges at 1570.

Figure 16:
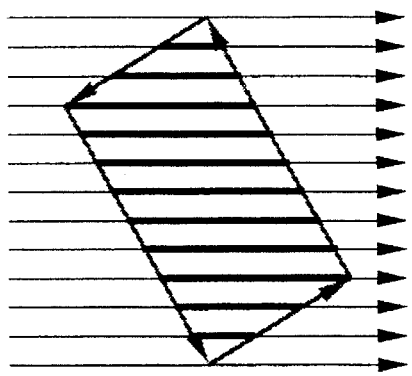
FIG. 16 illustrates scan conversion in the positive y direction in accordance with a preferred embodiment.

FIG. 16 illustrates scan conversion in the positive y direction in accordance with a preferred embodiment. The conversion is performed one scan line at a time which requires each edge to be monotonic in the y direction.

Figure 17:
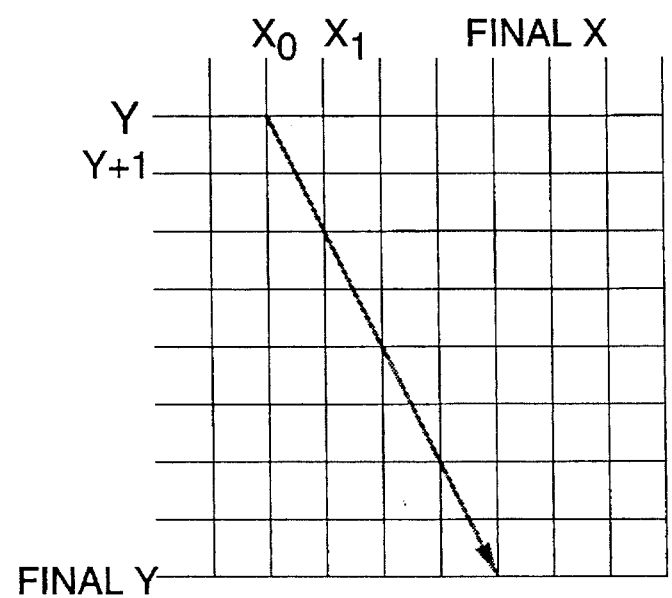
FIG. 17 illustrates a straight edge example in accordance with a preferred embodiment.

FIG. 17 illustrates a straight edge example in accordance with a preferred embodiment. The vector is a step function; f(x)=y+slope; where slope=0.5. The sign of this straight edge is +1.

The abstract base class for all edges has the following data structure:

x (real)—current x value;

y (integer)—current y value;

final y (integer)—y value at the bottom of the edge;

sign (integer)—+1 or −1, depending on the direction of the edge in y;

step function—called to advance to the next scan line; and transition function—called when the edge is crossed during scan conversion.

From the abstract base edge class for all edges, the following subclasses are derived: straight edge, vertical edge, ellipse edge, and sampled edge.

Straight edge—an edge that is a straight line, comprising:

x (real)—current x value;

y (integer)—current y value;

final y (integer)—y value at the bottom of the edge;

sign (integer)—+1 or −1, depending on the direction of the edge in y; and step function—adds the slope of the line to the current x value.

Vertical edge—an edge that is a vertical line, comprising:

x (real)—current x value;

y (integer)—current y value;

final y (integer)—y value at the bottom of the edge;

sign (integer)—+1 or −1, depending on the direction of the edge in y; and step function—does nothing because the x value is a constant for a vertical line.

Ellipse edge—an edge that is a vertical line, comprising:

x (real)—current x value;

y (integer)—current y value;

final y (integer)—y value at the bottom of the edge;

sign (integer)—+1 or −1, depending on the direction of the edge in y; and step function—calculates the next x value on the elliptical border based on the bresenham ellipse algorithm.

Sampled edge—an edge that is a sequence of straight line segments, comprising:

x (real)—current x value;

y (integer)—current y value;

final y (integer)—y value at the bottom of the edge;

sign (integer)—+1 or −1, depending on the direction of the edge in y; and step function—calculates the next value by either adding the slope of the current line segment to the current x value or skipping to the next line segment if the current one ended.

Figure 18:
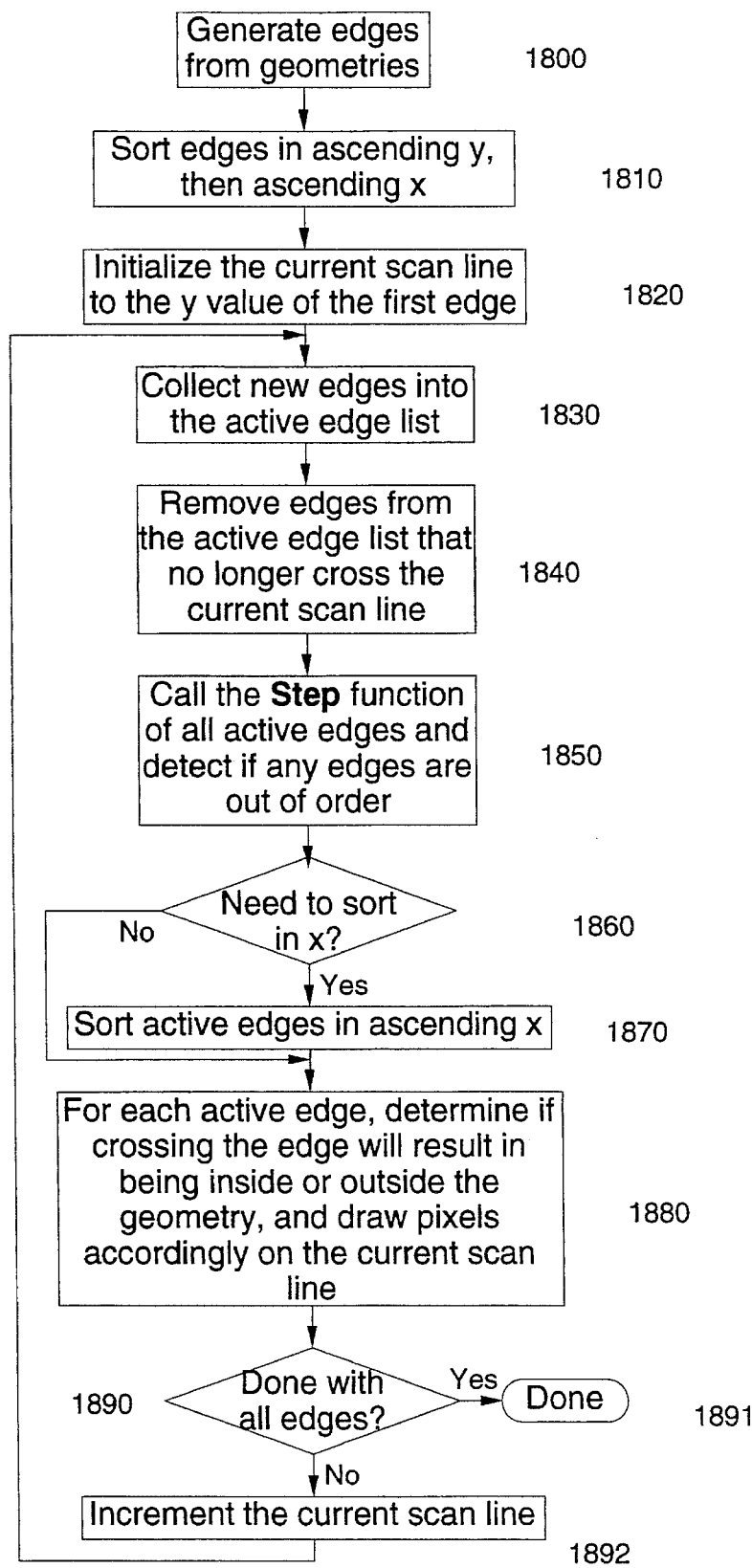
FIG. 18 is a flowchart of the logic in accordance with a preferred embodiment.

FIG. 18 is a flowchart of the logic in accordance with a preferred embodiment. Processing commences at function block 1800 to generate edges from a given geometry, such as a rectangle, ellipse or polygon. Then, at function block 1810 the edges are sorted in ascending y as the primary sort field and ascending x as the secondary sort field. Next, the current scan line is initialized to the y value of the first edge at function block 1820, the new edges are collected into the active edge list at function block 1830 (the active edge list is the list of edges that cross the current scan line), edges are removed from the active edge list if they no longer cross the current scan line in function block 1840, a step function is called for all active edges to detect if any edges are out of order in function block 1850 (an edge's step function calculates its next x value corresponding to the current scan line), and a test is performed at decision block 1860 to determine if it is necessary to sort edges in x. Sorting in x is necessary if new edges were added, old edges were removed, or edges have crossed. If sorting is necessary, then active edges are sorted in ascending x order in function block 1870 and control is passed to function block 1880. If sorting is not necessary, then control passes directly to function block 1880.

In function block 1880, for each active edge, a test is performed to determine if crossing the edge will result in transitioning outside the geometry and drawing pixels on the current scan line. The edge transition function can be used to generalize the mechanism by which inside/outside detection is done. Additional discussion of the logic is reserved for the discussion of FIGS. 19, 20 and 21 which set forth various embodiments of this processing. Then, at decision block 1890, a test is performed to determine if all the edges have been processed. If so, then processing is completed at terminal 1891. If not, then the current scan line is incremented at function block 1892 and control is passed to function block 1830 for further processing consistent with the logic set forth above.

Winding Number Rule

Figure 19:
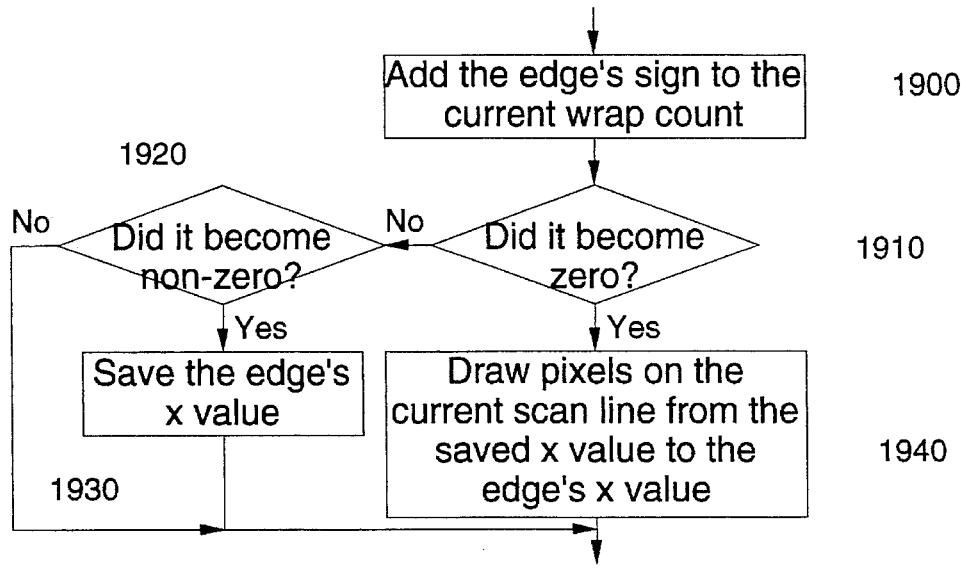
FIG. 19 is a flowchart setting forth an embodiment of edge transition processing in accordance with the subject invention.

FIG. 19 is a flowchart setting forth an embodiment of edge transition processing in accordance with the subject invention as set forth in function block 1880 of FIG. 18. Processing commences at function block 1900 where the edge's sign is added to the current wrap count, and a test is performed at decision block 1910 to determine if the wrap count has become zero. If so, then pixels are drawn on the current scan line from the saved x value to the edge's x value as shown in function block 1940. If not, then a test is performed at decision block 1920 to determine if the wrap count became non-zero. If the wrap count became non-zero, then the edge's x value is saved at function block 1930.

Even-Odd Rule

Figure 20:
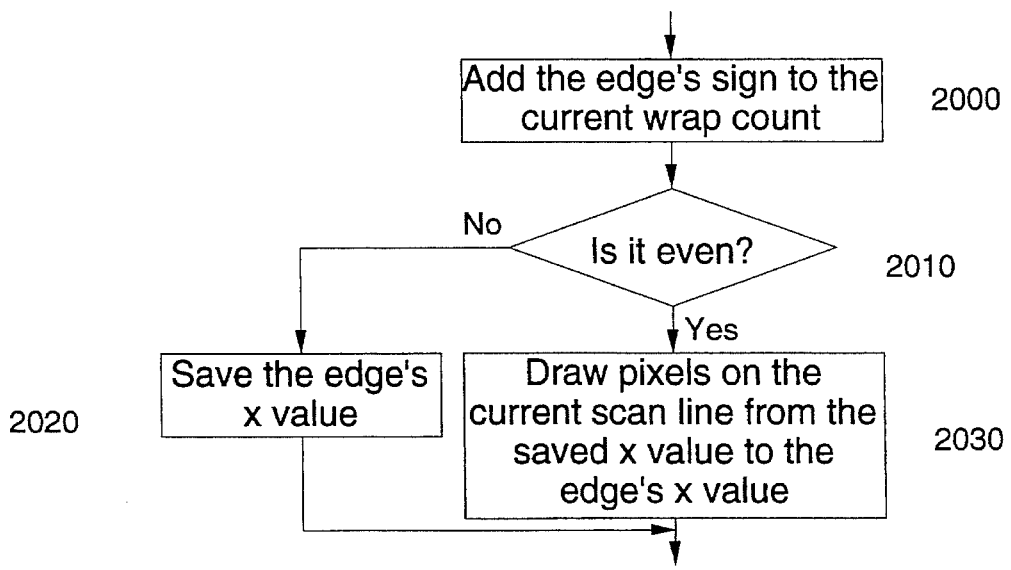
FIG. 20 is a flowchart setting forth an embodiment of edge transition processing in accordance with the subject invention.

FIG. 20 is a flowchart setting forth an embodiment of edge transition processing in accordance with the subject invention as set forth in function block 1880 of FIG. 18. Processing commences at function block 2000 where the edge's sign is added to the current wrap count, and a test is performed at decision block 2010 to determine if the current wrap count is even. If the edge count is even, then at function block 2030, pixels are drawn on the current scan line from the saved x value to the edge's x value. If the edge count is not even, then the edge's x value is saved at function block 2020.

Figure 21:
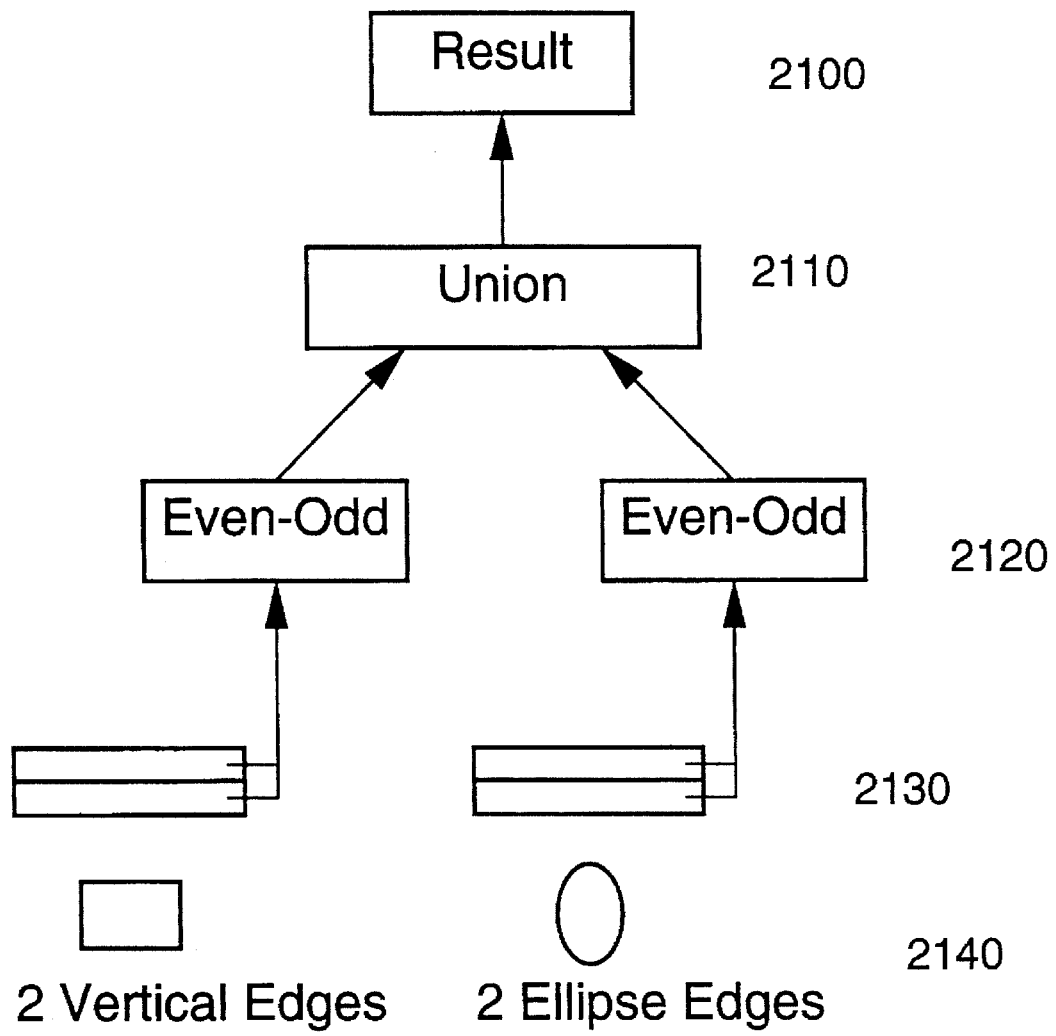
FIG. 21 is a block diagram setting forth an embodiment of edge transition processing in accordance with the subject invention.

FIG. 21 is a block diagram setting forth an embodiment of edge transition processing in accordance with the subject invention. The block diagram uses a union of a rectangle and an ellipse to illuminate transition processing. The resultant value is stored in the result block 2100.

The union object 2110 takes two even-odd values and calculates the logical union of the two values. The even-odd objects 2120 track each geometry's inside or outside status using even-odd logic. When an edge is crossed, its transition function is called via the blocks set forth at 2130. The edges for the rectangle and the ellipse are set forth at 2140.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An object-oriented method for scan converting a closed geometric figure having a plurality of edges into a plurality of scan line pixels, the method operating in a computer system having a memory, wherein the geometric figure is represented by a graphic object which is comprised of data describing the plurality of edges and an object function for traversing the plurality of edges to outline the figure, the method comprising the steps of:

(a) loading the graphic object into the memory;

(b) creating a plurality of edge objects each of which edge objects comprises edge data describing a predetermined edge shape and an edge function for moving along the predetermined edge shape, utilizing the steps of:

(b1) selecting a single name for the plurality of edge objects;

(b2) assigning the selected name to each of the plurality of edge objects; and (b3) assigning different parameters to each of the plurality of edge objects;

(c) accessing the graphic object and utilizing the data and the object function therein to select ones of the plurality of edge objects to represent the edges;

(d) creating an edge engine object comprising a plurality of scan line functions for identifying portions of scan lines which lie within the geometric figure and on the edges; and (e) using the edge engine object scan line functions and the selected ones of the plurality of edge objects to generate a plurality of scan line pixels corresponding to identified portions of scan lines.

2. A method as recited in claim 1, wherein step (b3) comprises the step of:

(b3a) selecting a set of parameters which allow additional edge objects to be created.

3. A method as recited in claim 1 wherein step (e) comprises the step of:

(e1) determining whether pixels in a scan line are inside or outside of the geometric figure.

4. A method as recited in claim 3 wherein step (e1) comprises the step of:

(e1a) utilizing an even-odd processing rule to determine whether pixels in a scan line are inside or outside of the geometric figure.

5. A method as recited in claim 3 wherein step (e1) comprises the step of;

(e1b) utilizing a winding-number processing rule to determine whether pixels in a scan line are inside or outside of the geometric figure.

6. A method as recited in claim 1 wherein step (c) comprises the step of:

(c1) using the object function to assemble the selected ones of the plurality of edge objects into a list.

7. A method as recited in claim 6 wherein step (e) comprises the step of:

(e2) utilizing the list during the processing of a scan line to determine whether any edges cross the scan line.

8. A method as recited in claim 1 wherein step (d) comprises the steps of:

(d1) creating an abstract class incorporating parts of a generic edge engine;

(d2) creating a plurality of scan line functions; and (d3) using the abstract class and the plurality of scan line functions created in step (d2) to create the edge engine object.

9. A method as recited in claim 1 wherein step (e) comprises the step of:

(e3) utilizing the selected ones of the plurality of edge objects to identify a start and an end of each identified portion of a scan line.

10. An apparatus for scan converting a closed geometric figure having a plurality of edges into a plurality of scan line pixels, wherein the geometric figure is represented by a graphic object which is comprised of data describing the plurality of edges and an object function for traversing the plurality of edges to outline the figure, the apparatus comprising:

(a) a processor;

(b) a memory;

(c) means controlled by the processor for loading the graphic object into the memory;

(d) means controlled by the processor for creating and storing a plurality of edge objects in the memory, each of which edge objects comprises edge data describing a predetermined edge shape and an edge function for moving along the predetermined edge shape; wherein the creating means comprises means for assigning a single name to each of the plurality of edge objects; and means for assigning different parameters to each of the plurality of edge objects;

(e) means responsive to the data and the object function in the graphic object for selecting ones of the plurality of edge objects to represent the edges; and (f) an edge engine object responsive to the selected ones of the plurality of edge objects for generating a plurality of scan line pixels which lie within the geometric figure and on the edges.

11. An apparatus as recited in claim 9, wherein the parameter assigning means utilizes a set of parameters which allow additional edge objects to be created.

12. An apparatus as recited in claim 10 wherein the edge engine object comprises means responsive to the selected ones of the plurality of edge objects for determining whether pixels in a scan line are inside or outside of the geometric figure.

13. An apparatus as recited in claim 12 wherein the edge engine object comprises means responsive to the selected ones of the plurality of edge objects for utilizing an even-odd processing rule to determine whether pixels in a scan line are inside or outside of the geometric figure.

14. An apparatus as recited in claim 12 wherein the edge engine object comprises means responsive to the selected ones of the plurality of edge objects for utilizing a winding-number processing rule to determine whether pixels in a scan line are inside or outside of the geometric figure.

15. An apparatus as recited in claim 10 wherein the selecting means comprises means responsive to the object function for assembling the selected ones of the plurality of edge objects into a list.

16. An apparatus as recited in claim 15 wherein the edge engine object comprises means responsive to the list for determining whether any edges cross a scan line during processing of the scan line.

17. An apparatus as recited in claim 10 further comprising means for creating an abstract class incorporating parts of a generic edge engine; means for creating a plurality of scan line functions; and means responsive to the abstract class and the plurality of scan line functions for creating the edge engine object.

18. An apparatus as recited in claim 10 wherein the edge object engine comprises means responsive to the selected ones of the plurality of edge objects for identifying a start and an end of each identified portion of a scan line.

19. An object-oriented method for scan converting a closed geometric figure having a plurality of edges into a plurality of scan line pixels, the method operating in a computer system having a memory, wherein the geometric figure is represented by a graphic object which is comprised of data describing the plurality of edges and an object function for traversing the plurality of edges to outline the figure, the method comprising the steps of:

(a) loading the graphic object into the memory;

(b) creating a plurality of edge objects each of which edge objects comprises edge data describing a predetermined edge shape and an edge function for moving along the predetermined edge shape, utilizing the steps of:

(b1) selecting a single name for the plurality of edge objects;

(b2) assigning the selected name to each of the plurality of edge objects; and (b3) assigning different parameters to each of the plurality of edge objects;

(c) accessing the graphic object and utilizing the data and the object function therein to select ones of the plurality of edge objects to represent the edges;

(d) creating an antialiased edge engine object comprising a plurality of scan line functions for identifying portions of scan lines which He within the geometric figure and on the edges and a plurality of antialiased scan line pixel generators for generating antialiased lines; and (e) using the antialiased edge engine object scan line functions and the selected ones of the plurality of edge objects to generate a plurality of scan line pixels corresponding to identified portions of scan lines, the plurality of scan line pixels being antialiased.

* * * * *